(12) United States Patent
Potter et al.

(10) Patent No.: US 8,016,539 B1
(45) Date of Patent: Sep. 13, 2011

(54) CHEMICAL APPLICATOR TRAILER EXTENDABLE HITCH

(75) Inventors: Scot L. Potter, Windom, MN (US); Darrell L. Dick, Mountain Lake, MN (US); Verlyn K. Fast, Bingham Lake, MN (US)

(73) Assignee: Fast Distributing, Inc., Mountain Lake, MN (US)

( * ) Notice: Subject to any disclaimer, the term of this patent is extended or adjusted under 35 U.S.C. 154(b) by 1097 days.

(21) Appl. No.: 11/459,699

(22) Filed: Jul. 25, 2006

(51) Int. Cl.
*B60P 1/04* (2006.01)

(52) U.S. Cl. .......... 414/467; 172/456; 172/457

(58) Field of Classification Search .......... 414/467; 172/456, 457, 677; 111/54; 180/208, 21, 180/234; 294/19.1
See application file for complete search history.

(56) References Cited

U.S. PATENT DOCUMENTS

| | | | | |
|---|---|---|---|---|
| 2,590,218 A * | 3/1952 | Steil | .............................. | 280/515 |
| 3,331,460 A * | 7/1967 | Bacon | ........................... | 180/208 |
| 3,635,495 A | 1/1972 | Orendorff | | |
| 3,841,494 A * | 10/1974 | Chalupsky et al. | ........... | 212/349 |
| 3,883,009 A * | 5/1975 | Swoboda et al. | ............. | 414/740 |
| 4,162,873 A * | 7/1979 | Smith, Jr. | ...................... | 414/718 |
| 4,232,990 A * | 11/1980 | Pierce | ........................... | 414/559 |
| 4,394,108 A * | 7/1983 | Cook et al. | ..................... | 414/680 |
| 4,403,427 A * | 9/1983 | Dahlquist | ...................... | 111/101 |
| 4,582,143 A * | 4/1986 | Pratt | ............................. | 172/311 |
| 6,183,160 B1 * | 2/2001 | Tapio et al. | ................... | 404/84.1 |
| 6,293,352 B1 * | 9/2001 | Hundeby et al. | .............. | 172/456 |
| 6,663,134 B2 | 12/2003 | Paluch et al. | | |
| 6,889,994 B1 | 5/2005 | Birkenbaugh | | |
| 6,941,686 B2 * | 9/2005 | Cusick | ............................ | 37/281 |

* cited by examiner

*Primary Examiner* — Saul Rodriguez
*Assistant Examiner* — Glenn Myers
(74) *Attorney, Agent, or Firm* — C. G. Mersereau; Nikolai & Mersereau, P.A.

(57) ABSTRACT

A telescoping adjustable length trailer hitch with an hydraulic actuator for adjusting the length of the trailer hitch. The hitch being adjustable to provide for a longer hitch for road travel and for a shorter hitch for use in farm fields what used with a chemical applicator. The adjustable length hitch having an outside roller on the top of the tube which telescopes into the main tube and a roller on the bottom of the outside roller for rolling on the inside of the main tube to prevent binding as one tube moves inside the other. The telescoping tubes having a hinged safety link connecting the telescoping tubes so that they will not separate. The distal end of the trailer hitch having a bracket for adjusting the height of the trailer hitch relative the towing vehicle and a safety chain for ensuring trailer and towing vehicle will not become separated.

10 Claims, 7 Drawing Sheets

CHEMICAL APPLICATOR TRAILER EXTENDABLE HITCH

BACKGROUND OF THE INVENTION

1. Field of the Invention

The present invention relates to an extendable hitch for changing the distance relative to a chemical applicator trailer's hitch point and the axle and/or application boom. More specifically the present invention allows the hitch length to be shortened for field application improving trailer's tracking performance.

2. Description of the Prior Art

Agricultural semi-trailed chemical application equipment generally consist of a rolling framework that supports a vessel to carry the application material and a boom mounted on the back of the framework for accurately distributing the chemical at a desired latitudinal distance from the centerline of the main trailer frame and the towing vehicle; tractor. The trailer is attached to the tractor through a load bearing pivot point at the rear of the tractor which allows the tractor-trailer combination to articulate for steering purposes.

The economies of chemical application is continuously increasing the latitudinal distance, swath width, of the application equipment in an effort reduce the number of passes required for a given area of land. In addition to increasing the boom lengths, larger chemical vessel capacities are also desired to reduce the number of reloading operations that are required. As the applicator boom lengths become increasingly longer they must have various folding capabilities to collapse the overall width for towing the trailer safely down a road. The distance the boom must be from trailer and tractor's connection point, hitch pin, is often determined by the complexity of the boom's folding capabilities so as to not obstruct the cab during road transport as well as by the chemical vessels volumetric capacity. Collapsing the boom for road transport can be costly and also jeopardize the boom structural integrity due to the multiple hinge points that are required. To reduce the complexity of the boom's folding features and increase the chemical reservoir's capacity of the trailer it has been a common industry practice to simply increase the distance between the hitch point of the trailer and the location of the boom. This in effect lengthens the trailer thereby moving the boom and axle arrangement further back from the hitch. The axle assembly must move proportionally with the boom in order to maintain a proper balance of the trailer unit to the hitch point as so to reduce or eliminate the reverse gravitational loading at the hitch pin or tractor's drawbar especially during low or empty reservoir volumes.

Increasing the distance between the tractor hitch pin and the trailer's axle however minimizes the trailer's ability to effectively follow in the same wheel track as the towing vehicle. This off-tracking is a common characteristic of fixed axle semi-trailed equipment whenever the refraction angle at the hitch point deviates from an aligned position such as when turning or steering corrections are necessary. Wheel off-tracking is also exaggerated on trailing equipment when traversing a side slope where gravitational force tends to pull or slide the trailer down the slope causing the trailer to yaw from an optimal path in which the center line of the trailer is aligned simultaneously with the centerline of the towing vehicle. Whether the result of side slopes or necessary navigating functions, whenever the trailer's wheel path deviates from the tractors wheel track there is a substantial risk of increased crop damage and loss of overall yield.

SUMMARY OF THE INVENTION

The agricultural chemical application semi-trailer with extendable hitch provides a means of varying the distance between the hitch point and the location of the trailer mounted boom. A multi-piece extendable and retractable framework is used in place of the industry standard rigid hitch. The extendable hitch is lengthened when the boom is folded for road transport to prevent the boom from encountering the towing vehicle. After the boom is unfolded in the field application position the hitch can be retracted to shorten the distance from the hitch pin to the trailer axle. Short coupling the trailer to the towing vehicle reduces the amount of off-tracking that occurs while turning corners or crossing side slopes. Further a telescoping hitch will reduce the complexity of the boom folding functions that are required to achieve the same short coupled trailer.

The extendable hitch has a hydraulic piston for extending and retracting a telescoping hitch. The telescoping hitch has rollers engaging the tubes as they telescope into each other at the junction of the tubes for smooth operation. The tubes also have plate shims to keep the tubes aligned as one tube slides into the other. The telescoping tubes also have a hinged safety device for insuring the tubes do not become disengaged. One end of the telescoping tubes has a height adjustment for setting the pintle hitch to the desired height and a safety chain to ensure the trailer will remain attached to the tractor pulling it if the hitch fails. The hydraulic piston is in line with the telescoping tubes of the hitch and adjusts the length of the hitch to the desired distance. The main tube of the front hitch extension contains flat bars for added weight near the trailer hitch to maintain a positive gravitational force.

OBJECTS OF THE INVENTION

It is an object of the invention to enhance the tracking performance of the applicator trailer relative to the towing vehicle.

It is an object of the invention to minimize the distance from the towing vehicle to the axle or axles of the trailer.

It is an object of the invention to provide a wider application boom

It is an object of the invention to reduce the boom folding functions

It is an object of the invention to maintain a positive load in the direction of gravitational force at the coupling connection between trailer and towing vehicle.

It is an object of the invention to adjust the length of the hitch.

It is an object of the invention to provide safety features on the hitch.

It is an object of the invention to provide for a smoothly adjustable length hitch.

Other objects, advantages, and novel features of the present invention will become apparent from the following description of the preferred embodiments when considered in conjunction with the accompanying drawings and illustrations.

DETAILED DESCRIPTION OF THE PREFERRED EMBODIMENTS

Figure 1:
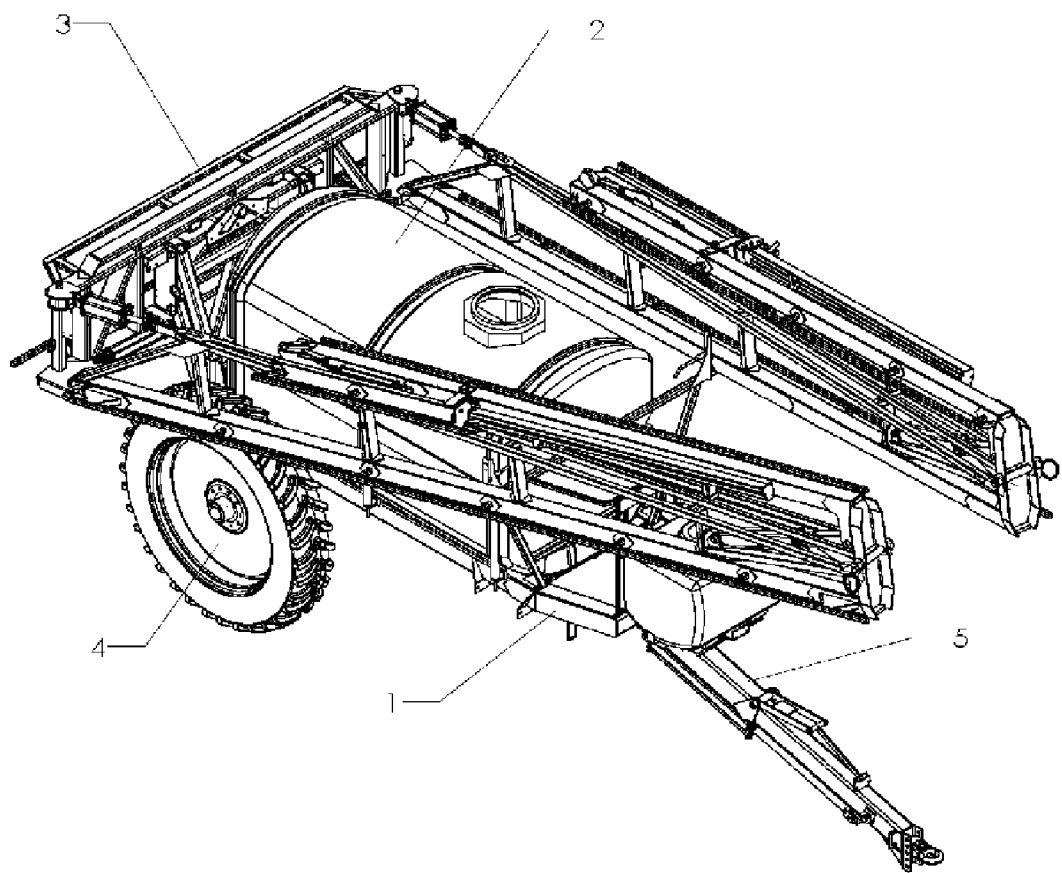
FIG. 1 is a perspective view of a chemical applicator trailer with the booms folded in the transport position built in accordance with the present invention.

Chemical applicator trailers made in accordance with the present invention all have various features in common. The first such feature is the carrier frame assembly 1 shown in FIG. 1 which carries the chemical reservoir vessel 2 and supports the spray boom 3. The chemical vessel 2 stores a mixture that is to be evenly applied to the ground or foliage through multiple distribution points located along the boom 3. The carrier frame 1 is partially supported by a rolling assembly which may consist of but is not limited to a wheel and tire 4 or a track assembly (not shown). The remaining resultant forces are typically supported by an exemplary rigid hitch assembly that protrudes from the front of the carrier frame 1 and is to be connected to a tractor or other powered vehicle in a conventional manner.

The present invention generally resides in the carrier frame assembly 1 and, more particularly, in the tongue or hitch sub-assembly 5 that forms part of the carrier frame assembly 1. For this reason, hereinafter, first, a typical sprayer boom assembly and carrier frame assembly are described in minimal detail and thereafter the hitch assembly is described in greater detail.

The exemplary boom assembly includes structural tubing and/or truss framework that suspends chemical delivery network capable of dispensing the chemical mixture at various latitudinal distances from the trailer's center line. Specifically FIG. 1 and FIG. 2 include a simple tubular truss configuration with nine coupled sections and multiple folding mechanisms for compact transport dimensions. The number of chemical discharge ports it may have suspended above the ground is determined by the desired consistent spacing in relationship to the overall unfolded length. The unfolded boom shown in FIG. 2 will provide for a consistent 20" spray pattern over 120 feet however smaller and larger boom widths are commonly practiced in the industry.

Figure 2:
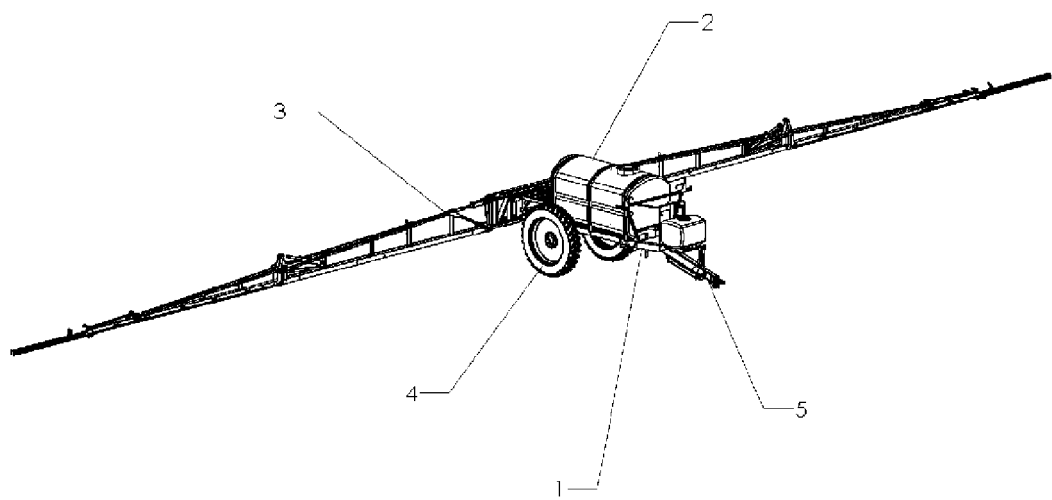
FIG. 2 is a perspective view of the chemical applicator trailer in the field operating position.

Also shown in FIG. 1 and FIG. 2, the carrier frame 1 is typically comprised of, but not limited to, rectangular tubing, channel iron, flat bar, and other structural steel members arranged in a manner that effectively transfers the gravitational loads incurred from supporting the chemical reservoir 2 and spray boom assembly 3 to the ground through the wheels 4 and the carrier's hitch assembly 5. A variety of carrier frame configurations may be used depending on the shape and size of the chemical reservoir 2 and the geometry of the boom assembly 3.

Figure 3:
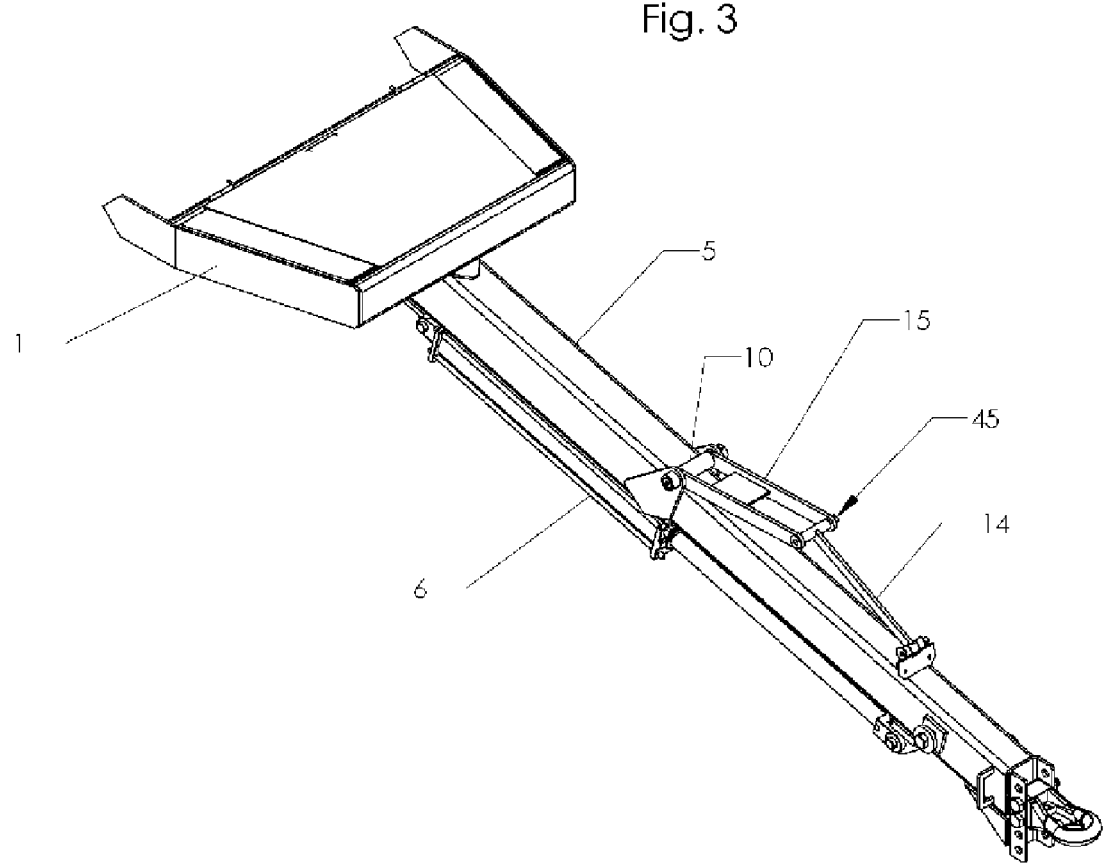
FIG. 3 is a perspective view of the extendable hitch assembly shown in FIGS. 1, & 2.

With the booms folded for transport as shown in FIG. 1, the two stage hitch embodiment of the invention has the ability to be lengthened to eliminate possible interference with the towing vehicle (not shown). After the booms 3 are unfolded for field application the two stage extendable hitch assembly 5 may be shortened as shown in FIG. 2 to reduce off-tracking from the towing vehicle (not shown). One manner to shorten or lengthen the two stage extendable hitch assembly 5 is by means of a hydraulic actuator 6 illustrated in FIG. 3.

Figure 4:
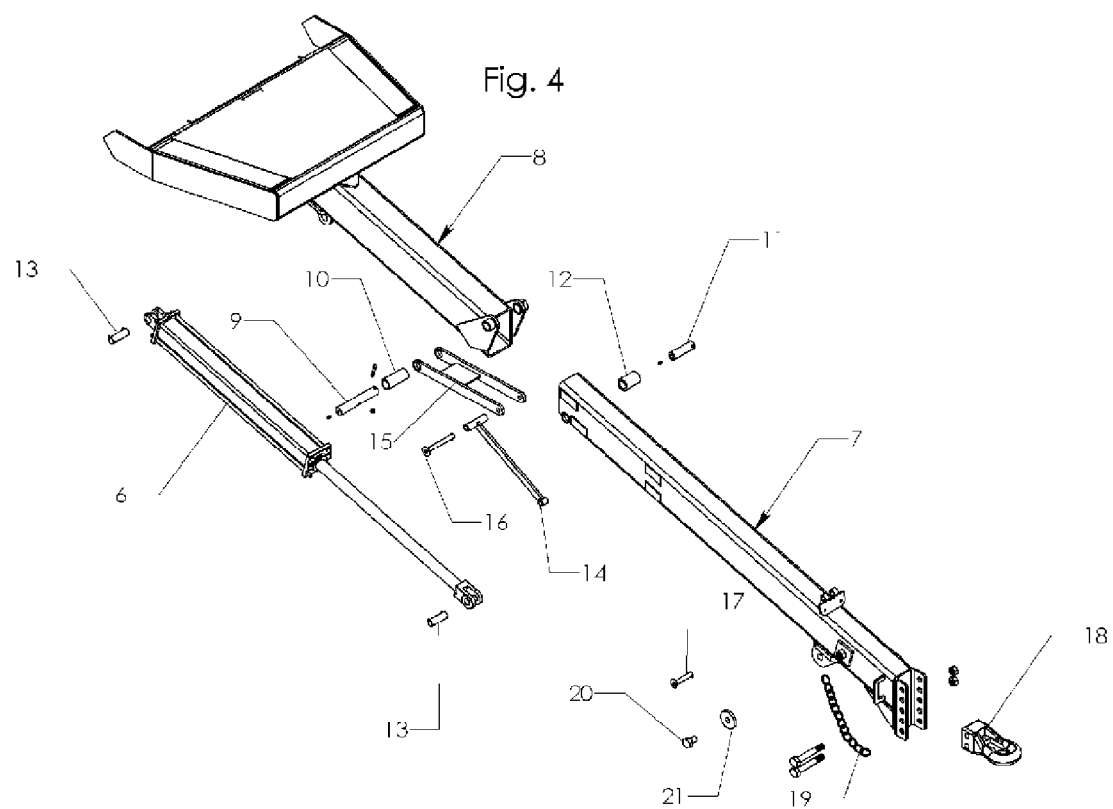
FIG. 4 is an exploded view of the extendable hitch.

Referring to FIG. 4. the two stage extendable hitch assembly 5 consists of a several components and subassemblies. As shown in the exploded view the dynamic front hitch extension assembly 7 slides inside of the main receiver tube assembly 8 which is rigidly secured to the trailer framework. A greasable pin 9 fastens a roller bushing 10 to the top end of the main receiver tube assembly 8 while another greasable pin 11 fastens a roller 12 to the bottom end of the dynamic front hitch assembly 7. These roller assemblies are intended to reduce the amount of scuffing and binding that may occur between the two telescopic assemblies 7 and 8. The base end of a hydraulic actuator 6 is pinned to the stationary receiver tube assembly 8 and the rod on the rod end of the hydraulic actuator 6 is pinned by pin 13 to the dynamic front hitch assembly 7 at lug 27. Supplying hydraulic flow and pressure to and from the ports of this hydraulic actuator 6 causes the dynamic front hitch assembly 7 to extend or retract as desired. A lower safety link 14 is pinned by pin 16 to the upper safety link 15 and fastened to the dynamic front hitch extension 7 by another pin 17. The other end of the upper safety link 15 is secured to the receiver tube assembly 8 with the common pin 9 that also secures the roller bushing 10. This hinged safety assembly 15 prevents the front hitch assembly 7 and the main receiver tube assembly 8 from separating in the event that the hydraulic actuator 6 would fail. A pintle hitch 18 is bolted to the end of the dynamic front hitch assembly 7 for coupling to the towing vehicle. One end of a safety chain 19 is fastened to the dynamic front hitch assembly 7 by means of a bolt 20 and washer 21 with the other end to be secured to the towing vehicle.

Figure 5:
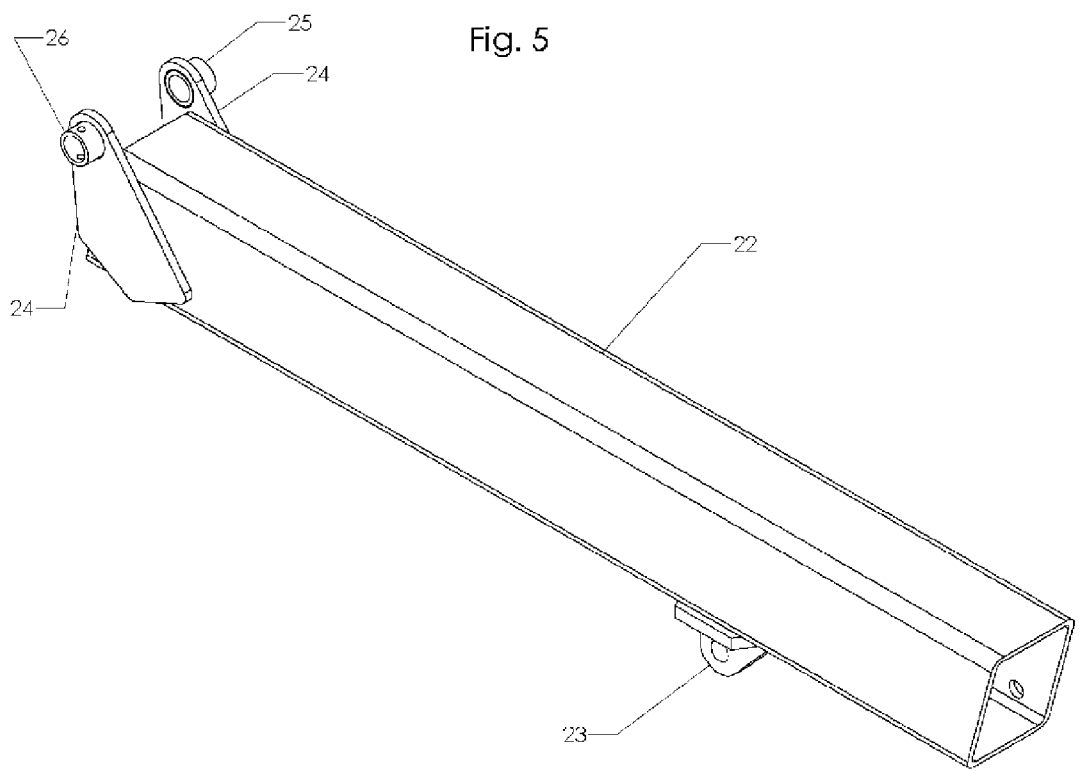
FIG. 5 is a detailed view of the rigid receiver tube assembly.

The main tube 22 of the fixed receiver tube assembly 8 in FIG. 5 is rigidly fastened to the carrier frame 1 preferably by welding. A hydraulic actuator mounting lug 23, close to the end of the tube nearest to the carrier frame 1, is used to secure the base end of the hydraulic actuator 6 to the main receiver tube assembly 8 with pin 13. Side plate profiles 24 are configured at the open end of the receiver tube 22 with a solid D.O.M bushing 25 and a drilled D.O.M. bushing 26 so as to facilitate the means for attaching a roller assembly and upper safety link 15 shown in FIG. 4.

Figure 6:
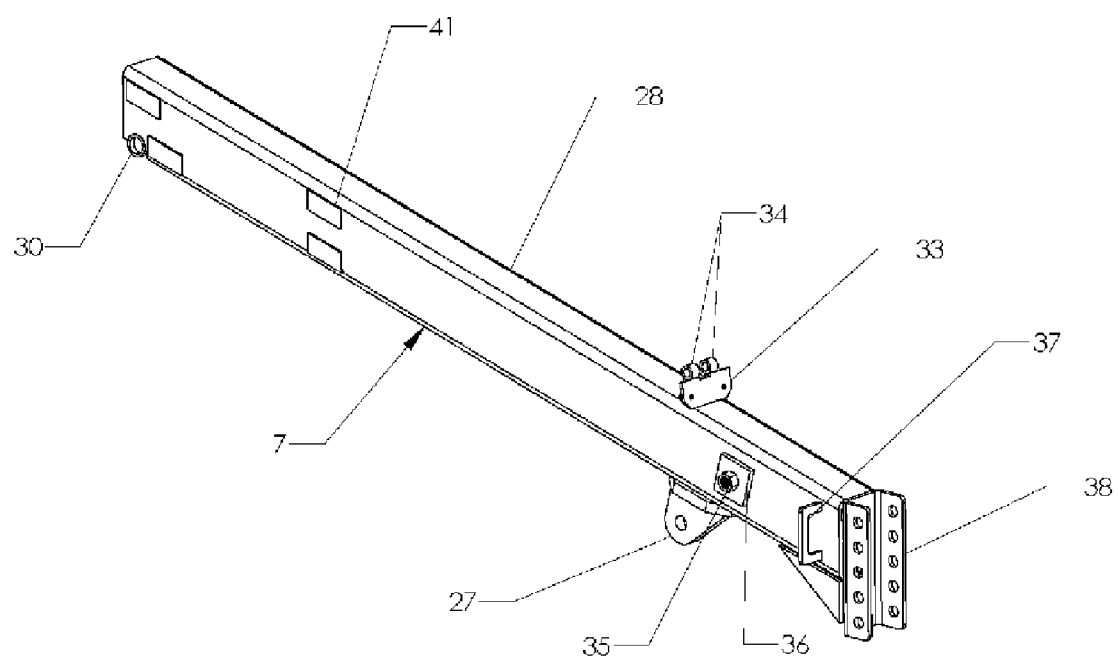
FIG. 6 is a perspective view of the right rear of the main tube front hitch extension with a cut away section.
Figure 7:
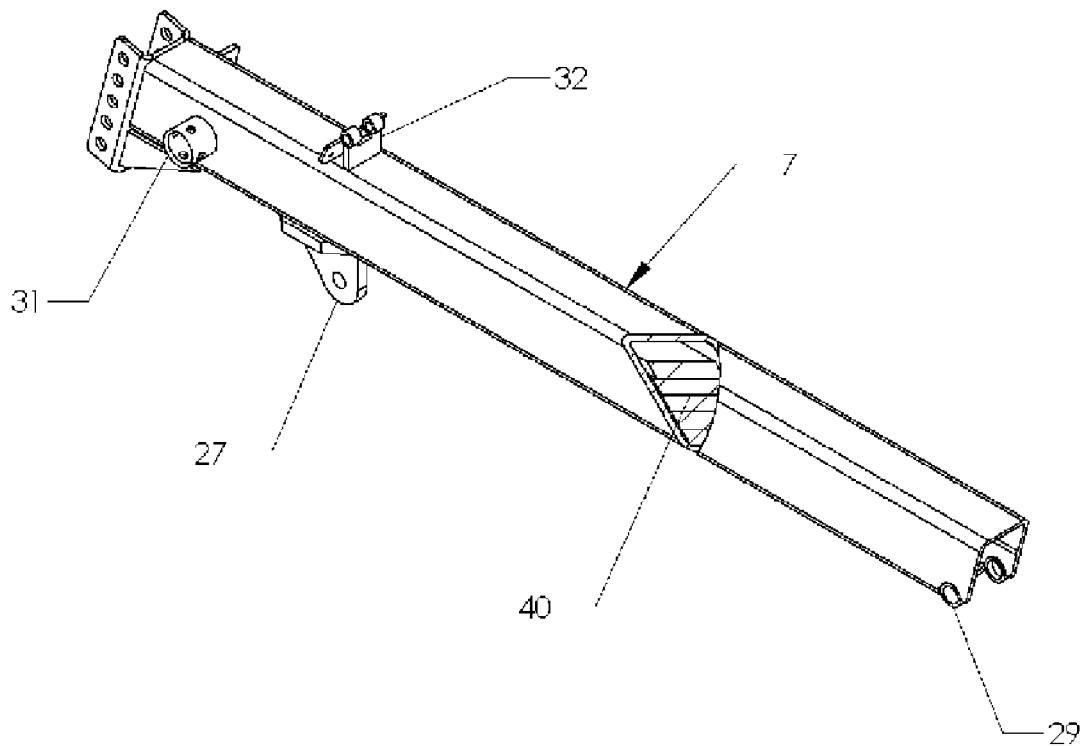
FIG. 7 is a perspective view of the left front of the main tube front hitch extension.

Referring now to FIGS. 6 and 7, the dynamic front hitch extension 7, a hydraulic actuator lug 27 is welded on the bottom of front hitch extension's main tube 28 near the hitch end and is used to pin the rod end of the hydraulic accumulator 8 to the front hitch extension assembly 5 with pin 13. A drilled bushing 29 along with solid bushing 30 are welded to the tube front hitch extension main tube 28 to facilitate the means for attaching the interior roller assembly comprising roller 12 on pin 11 as shown in FIG. 4 which rolls inside of main tube of the front hitch assembly 28. Four flat plate shims 41 are fixed to the right side of the front hitch extensions main tube 28 to stabilize the tube within the cavity of the stationary receiver tube assembly 8. A jack stand receiver 31 is welded to the right side of the main tube 28. A flat plate 32 and supplementary gusset 33 on top of the main tube of the front hitch extension 28 hold in place the safety link bushings 34 so as to securely pin the hinged safety link 45 to the dynamic front hitch assembly 7 shown in FIGS. 3 and 4. A retaining nut 35 and backing plate 36 on the right hand side of the front hitch extension main tube 28 secures the hitch safety chain 19 to the front hitch assembly 7 to maintain a connection to the towing vehicle in the event that the hitch pin (not shown) would fail or come loose. A formed hitch bracket 38 with a plurality of holes is located on the end of the front hitch extension main tube 28 such that a typical pintle hitch 18 shown in FIG. 4 may be bolted in place at a desired distance from the ground in order to keep the longitudinal axis of the chemical reservoir 2 parallel to the ground when coupled to the towing vehicle's drawbar (not shown). Two gussets 39 are used to reinforce the unsupported length of the formed hitch bracket 38. A chain holder 37 is placed between the safety chain retaining nut 35 and the hitch bracket 38 to restrain the safety chain 19. In order to maintain a positive gravitational force at the location of the trailer to vehicle's coupling location a multitude of flat bars 40 approximately the length of the front hitch extension main tube 28 is placed inside the hollow cavity of the front hitch extension main tube 28.

Obviously, many modifications and variations of the present invention are possible in light of the above teachings. It is therefore understood that, within the scope of the appended claims, the invention may be practiced otherwise than as specifically described.

What is claimed is:

1. An extendable trailer hitch comprising:
a main receiver tube and a front hitch extension tube, wherein said main receiver tube is attached to a trailer frame and has an open end adapted to receive said front hitch extension tube, which is adapted to be received in and telescope inside of said main receiver tube,
a receiver tube roller mounted between support members on each side of and proximate the open end of the main receiver tube and disposed to ride on the top of the front hitch extension tube,
an extension tube roller mounted on the base of and carried by the front hitch extension tube near an end thereof for engaging the inside of the main receiver tube,
a hinged safety link for preventing separation of the main receiver tube and the front hitch extension tube pivotably connected to and extending from said support members on each side of the open end of the main receiver tube and pivotably connected to a member attached to the front hitch extension tube,
an hydraulic actuator attached to a mounting lug on the main receiver tube, the hydraulic actuator having a rod end attached to a lug on the front hitch extension tube,
a hitch on the end of the front hitch extension tube.

2. An extendable trailer hitch as in claim 1 having,
a bar inside of the front hitch extension tube to weigh down the trailer hitch near the hitch.

3. An extendable trailer hitch as in claim 1 having,
a flat plate on the side of the front hitch extension tube for slidable engagement with the inside of the main receiver tube.

4. An extendable trailer hitch as in claim 1 having,
a hitch bracket attached to the distal end of the front hitch extension tube with a plurality of vertical apertures for adjusting the height of a hitch attached thereto.

5. An extendable trailer hitch as in claim 1 having,
a jack stand receiver attached to the side of the front hitch extension tube.

6. An extendable trailer hitch as in claim 1 having,
a chain holder attached to the side of the front hitch extension tube adapted to hold a safety chain when said chain is attached to the side of the front hitch extension tube.

7. An extendable trailer hitch as in claim 2 having,
a flat plate on the side of the front hitch extension tube for slidable engagement with the inside of the main receiver tube.

8. An extendable trailer hitch as in claim 7 having,
a hitch bracket attached to the distal end of the front hitch extension tube with a plurality of vertical apertures for adjusting the height of a hitch attached thereto.

9. An extendable trailer hitch as in claim 8 having,
a jack stand receiver attached to the side of the front hitch extension tube.

10. An extendable trailer hitch as in claim 9 having,
a chain holder attached to the side of the front hitch extension tube adapted to hold a safety chain when said chain is attached to the side of the front hitch extension tube.

\* \* \* \* \*